United States Patent
Kumakura

[11] Patent Number: 5,842,051
[45] Date of Patent: Nov. 24, 1998

[54] CAMERA

[75] Inventor: Toshiyuki Kumakura, Tokyo, Japan

[73] Assignee: Canon Kabushiki Kaisha, Tokyo, Japan

[21] Appl. No.: 812,077

[22] Filed: Mar. 6, 1997

Related U.S. Application Data

[63] Continuation of Ser. No. 430,607, Apr. 28, 1995, abandoned, which is a continuation of Ser. No. 117,659, Sep. 8, 1993, abandoned, which is a continuation of Ser. No. 692,261, Apr. 26, 1991, abandoned.

[30] Foreign Application Priority Data

Apr. 27, 1990 [JP] Japan .................................. 2-112666

[51] Int. Cl.⁶ .................................................. G03B 17/00
[52] U.S. Cl. ................................................. 396/52; 396/55
[58] Field of Search .......................................... 396/52, 55

[56] References Cited

U.S. PATENT DOCUMENTS

| | | | |
|---|---|---|---|
| 4,462,671 | 7/1984 | Suzuki et al. | 354/430 |
| 4,586,029 | 4/1986 | Tamura et al. | 354/289.1 |
| 4,673,276 | 6/1987 | Yoshida et al. | 354/430 |
| 4,965,619 | 10/1990 | Shikaumi et al. | 354/430 |
| 5,012,270 | 4/1991 | Sekine et al. | 354/430 |
| 5,030,984 | 7/1991 | Buckler et al. | 354/430 |
| 5,060,007 | 10/1991 | Egawa | 354/430 |
| 5,084,724 | 1/1992 | Maeno | 354/430 |
| 5,101,230 | 3/1992 | Shikaumi et al. | 354/430 |
| 5,109,249 | 4/1992 | Kijajima | 354/430 |
| 5,198,856 | 3/1993 | Odaka et al. | 354/430 |
| 5,220,375 | 6/1993 | Ishida et al. | 354/430 |

FOREIGN PATENT DOCUMENTS

62-196639  8/1987  Japan .

Primary Examiner—Russell E. Adams
Attorney, Agent, or Firm—Fitzpatrick, Cella, Harper & Scinto

[57] ABSTRACT

A camera comprises discrimination means for discriminating whether an image stabilizing function is active or not and control means responsive to the discrimination by the discrimination means that the image stabilizing function is active for changing a shutter speed for an image blur warning or inhibiting the image blur warning.

28 Claims, 6 Drawing Sheets

CAMERA

This application is a continuation of U.S. patent application Ser. No. 08/430,607 filed Apr. 28, 1995, which is a continuation of Ser. No. 08/117,659 filed Sep. 8, 1993, which is a continuation of Ser. No. 07/692,261 filed Apr. 26, 1991, all now abandoned.

BACKGROUND OF THE INVENTION

1. Field of the Invention

The present invention relates to an improvement of a camera which can stabilize an image.

2. Related Background Art

An exposure control of a camera may be done in various modes such as a program mode, a shutter speed priority mode and an aperture priority mode, and optimum aperture and shutter speed are automatically selected in accordance with a brightness and a sensitivity of a film to be used. If a shutter speed selected in the auto-exposure mode is one which may easily cause hand vibration, a hand vibration warning is issued to an operator.

Various image stabilizing devices for preventing hand vibration have been recently proposed. By virtue of the image stabilizing function, the operator may take a picture less susceptible to hand vibration even if he/she selects a slower shutter speed.

However, in the prior art, since a hand vibration warning is issued for a shutter speed which is slower than a predetermined speed, the warning is issued even if a stabilized photograph may be taken by the operation of the image stabilizing function.

SUMMARY OF THE INVENTION

In the light of the above, it is an object of the present invention to provide a camera which can determine the state and efficacy of the image stabilizing function.

In order to achieve the above object, the camera of the present invention comprises discrimination means for discriminating whether the image stabilizing function is active or not and control means, responsive to the discrimination by the discrimination means that the image stabilizing function is active, for changing the shutter speed for the image blur warning or the inhibiting the image blur warning.

Further, in order to achieve the above object, in the camera of the present invention, the control means takes into consideration the focal distance information of a photographing optical system.

Other objects of the present invention will become apparent from the following detailed description of the embodiments.

DETAILED DESCRIPTION OF THE PREFERRED EMBODIMENTS

Embodiments of the present invention are now explained in detail with reference to the drawings.

Figure 1:
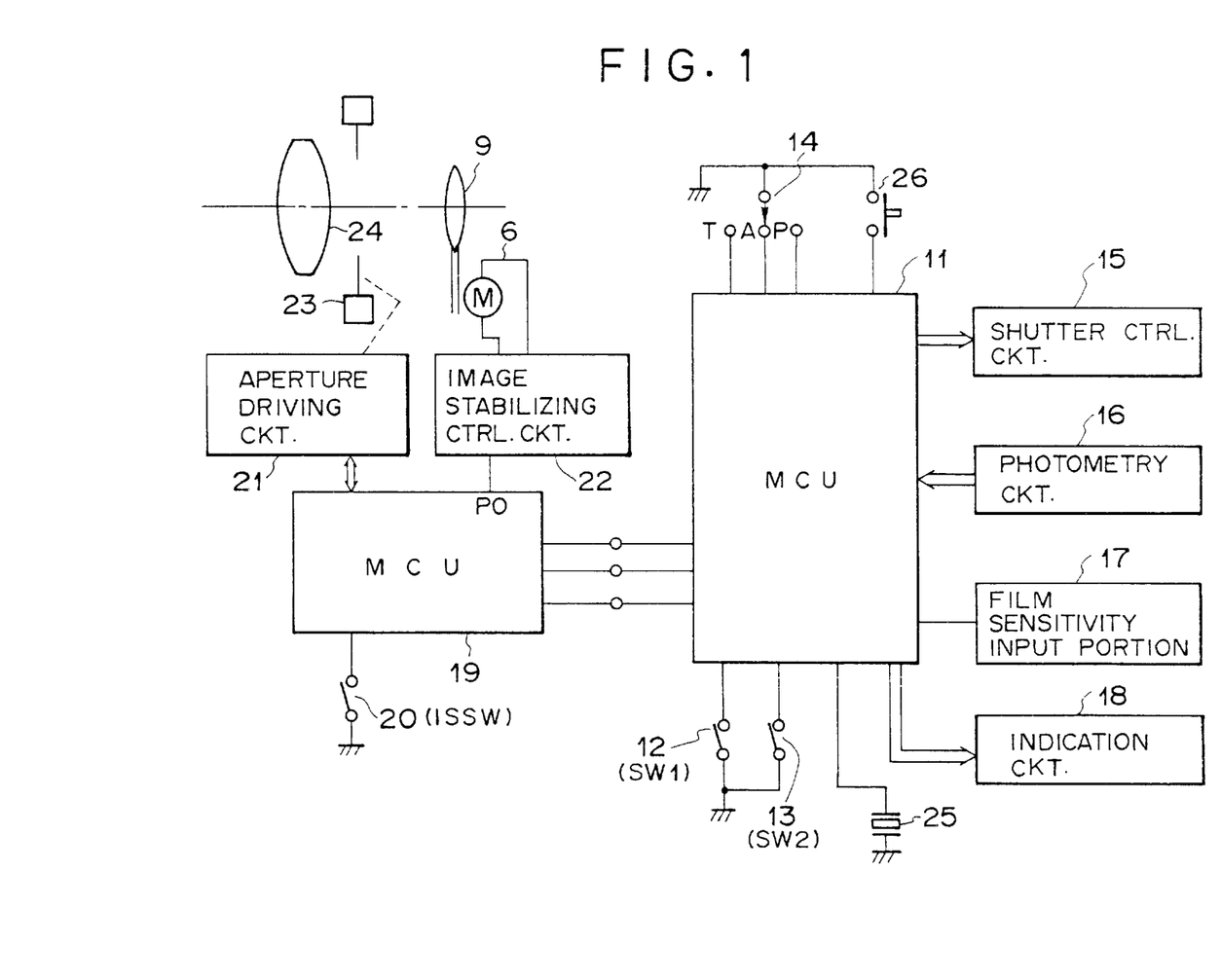
FIG. 1 shows a block diagram of a camera in accordance with one embodiment of the present invention.

FIG. 1 shows a block diagram of an overall configuration of a camera in accordance with one embodiment of the present invention. Numeral 11 denotes a microcomputer which controls an overall operational sequence of the camera, numeral 12 denotes a switch (SW1) which is turned on by half-depression of a shutter release button, numeral 13 denotes a release switch (SW2) which is turned on by full depression of the release button, and numeral 14 denotes an auto-exposure mode selection switch. When an arm thereof is at a contact T, a shutter priority mode is selected, when the arm is at a contact A, an aperture priority mode is selected, and when the arm is at a contact P, a program mode is selected, and the selection is detected by the microcomputer 11. Numeral 15 denotes a shutter control circuit for driving a shutter leading curtain and a shutter trailing curtain by a command from the microcomputer 11; numeral 16 denotes a photometry circuit to provide object brightness information to the microcomputer 11 as exposure condition setting information; numeral 17 denotes a film sensitivity detector which automatically reads a DX code of a film and provides film sensitivity information to the microcomputer 11 (or it may provide manually entered film sensitivity information), and numeral 18 denotes a display circuit for displaying photographing information such as an aperture value and a shutter speed.

Numeral 19 denotes a microcomputer in a lens for sequence-controlling the lens, numeral 20 denotes an image stabilizer activation switch (ISSW) numeral 21 denotes a known aperture drive circuit, numeral 22 denotes an image stabilizing control circuit (which will be described in detail, together with a lens drive motor 6 and a lens 9), numeral 23 denotes an aperture vane mechanism, numeral 24 denotes a lens which is a part of the photographing lens, numeral 25 denotes a buzzer which generates sound when a shutter speed selected is one which will cause hand vibration, and numeral 26 denotes an exposure selection switch. In the shutter priority mode, the shutter speed is changed by the actuation and deactuation of the switch, and in the aperture priority mode, the aperture is changed.

Figure 2:
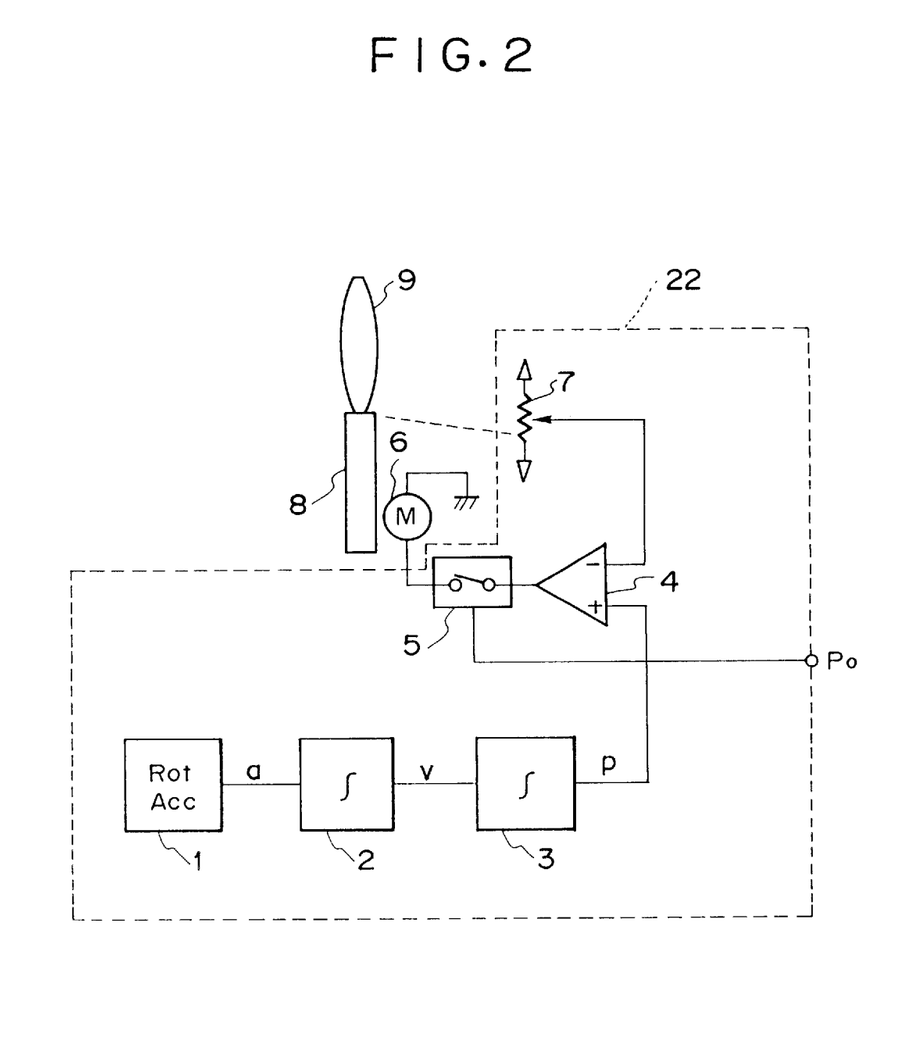
FIG. 2 shows an image stabilizing control circuit of FIG. 1 and a periphery circuit thereof.

FIG. 2 shows the image stabilizing control circuit 22 and a peripheral circuit thereof.

Numeral 1 denotes an acceleration meter for detecting a vibration status of the lens. A gradient of a camera (not shown) relative to a photographing optical axis is detected as an acceleration to produce an acceleration signal a. Numeral 2 denotes a first integrator for converting the detected acceleration signal a to a velocity signal v, numeral 3 denotes a second integrator for converting the velocity signal v to a displacement signal p, numeral 4 denotes an operational amplifier, numeral 5 denotes an analog switch which is turned on when a terminal PO is at a high level and turned off when it is at a low level, numeral 6 denotes a lens drive motor, numeral 7 denotes a lens position detecting potentiometer, numeral 8 denotes a lens support rod, and numeral 9 denotes a lens which is moved up and down to prevent the image blur.

In the configuration of FIG. 2, when the (ISSW) 20 of FIG. 1 is turned on, the terminal PO of the microcomputer 19 assumes the high level so that the analog switch 45 is turned on to start the image stabilizing operation. Namely, a known image stabilizing feedback loop is formed so that the operational amplifier 4 drives the lens drive motor 6 such that the displacement signal p from the second integrator 3 matches to the displacement of the lens 9 detected by the potentiometer 7, and the lens 9 is displaced to prevent the image blur.

An operation of the above configuration is now explained with reference to a flow chart of FIG. 3 which illustrates an operation of the microcomputer 11.

At #1, the microcomputer 11 determines whether the switch SW1 is on or not. If it is off, it immediately stops the operation. If it is on, the film sensitivity is read by the film sensitivity detector 17 at #2. (The film sensitivity is represented by an Sv value which is a photographic unit). At #3, an object brightness is detected by the photometry 16. (It is represented by Bv). At #4, an Ev value is calculated based on those data. This is done by summing the film sensitivity in an apex value and the brightness (Bv+Sv). At #5, thorough communication with the microcomputer 19 in the lens, an open aperture value, information as to whether the image stabilizing device is active (ISON) or not, and a lens focal distance f (short focus (W), medium focus (N) or long focus (T), including a focal distance of an exchangeable single focus lens and a set focal distance of a multi-focus lens or a zoom lens) are obtained. At #6, the state of the auto-exposure mode selection switch 14 is detected to determine the exposure mode of the camera.

If the shutter priority mode (T) is detected at #6, a shutter speed Tv is entered at #7, and, at #8, an aperture Av is determined by a difference (Ev−Tv) between the shutter speed Tv and Ev determined in #4. A flag F is reset to "0" at #9. The flag F is used to issue a hand vibration warning by the display circuit 18 and the buzzer 25.

If the aperture priority mode (A) is detected at #6, the aperture value Av is entered at #10, and at #11 a shutter speed Tv is determined based on a difference (Ev−Av) between the aperture value Av and Ev determined at #4. Then, the process proceeds to #13.

If the program mode is detected at #6, a shutter speed Tv and an aperture value Av are determined at #12 based on a programmed diagram in the microcomputer and Ev determined at #4. Then, the process proceeds to #13.

Figure 4:
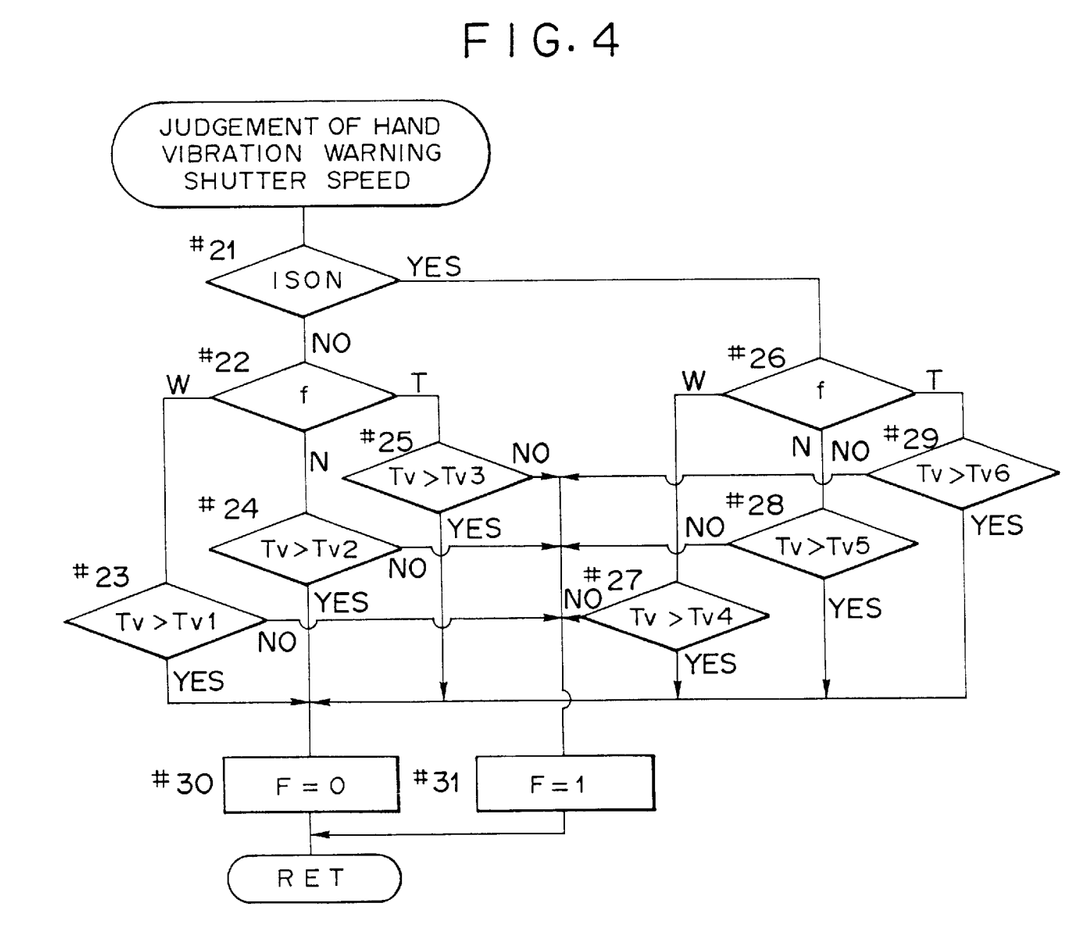

At #13, a sub-routine, for determining a shutter speed which causes hand vibration, shown in FIG. 4 is called.

The sub-routine of FIG. 4 is now explained. At #21, the ISON information is detected from the lens information entered at #5. If the image stabilizing device (IS) is not active, the lens focal distance f is detected at #22. If it is the short focus (for example, a lens having f smaller than 35 mm), whether the currently selected shutter speed is higher than a predetermined speed or not is determined at #23. The decision is made based on the photographic apex value. If the actual shutter speed (for example, 1/250 second =apex value Tv=8) is shorter than the shutter speed for the hand vibration warning, the apex value is determined as large. The predetermined shutter speed is one which requires the hand vibration warning for the short focus lens when the image stabilizing device is not active. Normally, it is approximately 1/f. At #23, if the shutter speed Tv is larger than the shutter speed for the hand vibration warning $Tv_1$, the hand vibration warning flag F is set to "0" at #30. If it is smaller at #23, the flag F is set to "1" at #31.

If the medium focal distance (for example, f=35–135 mm) is detected at #22, the shutter speed for the hand vibration warning for the medium focus (for example, 1/60 second= apex value $Tv_2$=6) and the currently selected shutter speed Tv are compared at #24. If the latter is larger, the flag F is set to "0" at #30; If it is smaller, the flag F is set to "1" at #31.

If the long focus (for example, f is larger than 135 mm) is detected at #22, the shutter speed for the hand vibration warning for the long focus (for example, 1/125 second=apex value $Tv_3$=7) and the currently selected shutter speed Tv are compared at #25, and if the former is smaller, the flag F is set to "0" at #30, and if it is larger, the flag F is set to "1" at #31.

On the other hand, if ISON, that is, the active state of the image stabilizing device is detected at #21, the lens focal distance f is determined at #26.

If the short focus is detected at #26, the shutter speed $Tv_4$ for the hand vibration warning for the short focus and the currently selected shutter speed Tv are compared. When the image stabilizing device is active, the hand vibration warning may be issued at a smaller shutter speed than the shutter speed $Tv_1$ for the same focal distance f because of the image stabilizing function during the active state of the image stabilizing device. Accordingly, the shutter speed $Tv_4$ for determining whether Tv>$Tv_4$ is, for example, 1/15 second (apex value $Tv_4$=4). If Tv>$Tv_4$, the flag F is set to "0" at #30, and if Tv≦$Tv_4$, the flag F is set to "1" at #31.

If the medium focus is detected at #26, the shutter speed $Tv_5$ for the hand vibration warning for the medium focus and the currently selected shutter speed are compared at #28. The shutter speed $Tv_5$ for the hand vibration warning is smaller than $Tv_2$ for the same reason as that for the shorter focus, and it is, for example, 1/30 second (apex value $Tv_5$=5). If Tv>$Tv_5$, the flag F is set to "0" at #30, and if Tv≦$Tv_5$, the flag F is set to "1" at #31.

When the long focus is detected at #26, the shutter speed $Tv_6$ for the hand vibration warning for the long focus and the currently selected shutter speed Tv are compared at #29. Again, the shutter speed $Tv_6$ for the hand vibration warning is smaller than $Tv_3$, and it is, for example, 1/60 second (apex value $Tv_6$=6). If Tv>$Tv_6$, the flag F is set to "0" at #30, and if Tv≦$Tv_6$, the flag F is set to "1" at #31.

Figure 3:
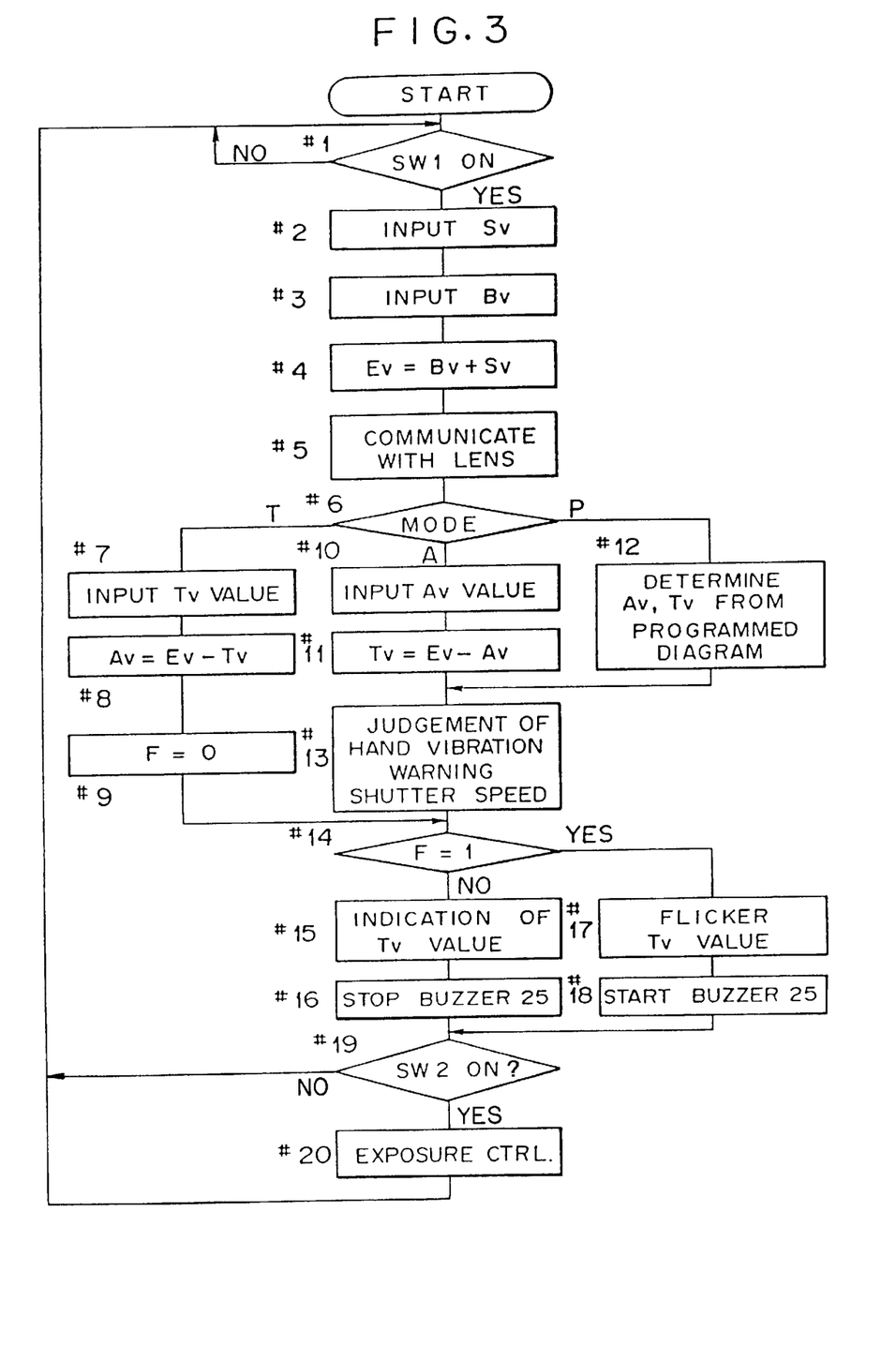
FIGS. 3 and 4 show flow charts of a first operation of the circuit of FIG. 1.

After the flag F has been set, the process returns to the flow of FIG. 3.

After the return, the flag F is determined at #14. If F="0", the shutter speed Tv is displayed at #15. It is digitally displayed on an LCD panel of the display circuit as the currently selected shutter speed. At #16, the buzzer 25 is kept deactivated.

If F="1" is detected at #14, the shutter speed Tv is flashed at #17 to give the hand vibration warning. This is done by turning on and off the digital display of the display circuit 18 at approximately 2 Hz. The buzzer 25 is activated at #18 to generate the sound for the hand vibration warning. This is done by applying a square wave of approximately 2 KHz to the buzzer 25 by the microcomputer 1.

At #19, whether the switch SW2 is on or not is determined. If it is not on, the process returns to #1, and the above sequence is repeated until the switch SW1 is turned off. If the switch SW2 is on at #19, a known exposure control is effected at #20. Specifically, the aperture information determined at #7 and #8 is informed to the microcomputer 19 in the lens so that the microcomputer 19 activates the drive circuit 21 to control the aperture to the value determined by the camera. Then, the microcomputer 11 causes the shutter control circuit 15 to control the leading curtain and the trailing curtain based on the shutter speed determined at #7 and #8.

After the above exposure control, the process returns to #1.

A second operation of the circuit of FIG. 1 is now explained with reference to a flow chart of FIG. 5 which illustrates an operation of the microcomputer 11.

In the previous embodiment, the shutter speeds $Tv_1$–$Tv_6$ for the hand vibration warning are separately prepared for each lens focal distance f and the activation state of the image stabilizing device. In the present embodiment, the shutter speed for the hand vibration warning when the image stabilizing device is not activated (IS OFF) is a reciprocal of the lens focal distance f (apex value=1/f), and the shutter speed for the hand vibration warning in the ISON state is smaller than the shutter speed for the hand vibration warning in the ISOFF state by a specific value, for example, two steps (2F).

Figure 5:
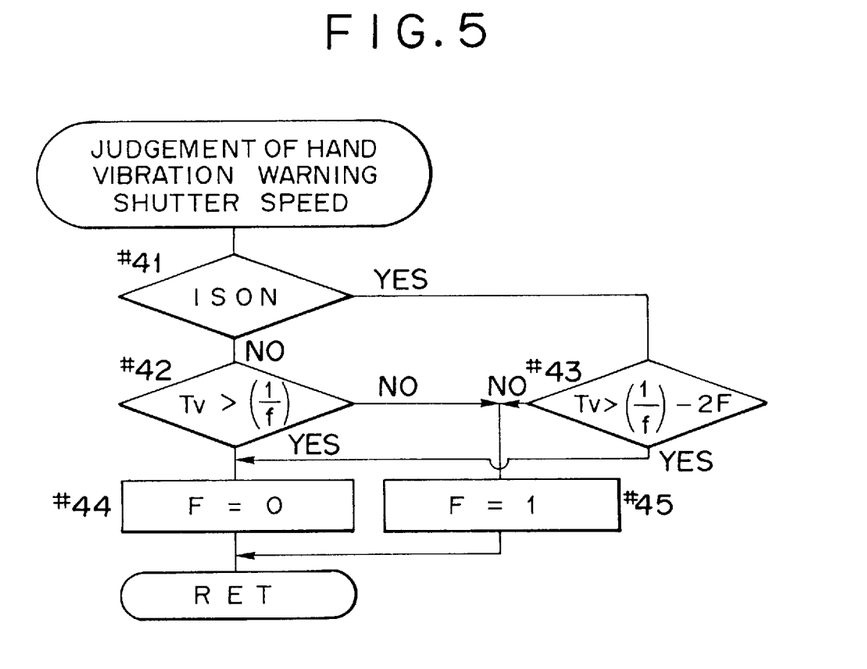
FIG. 5 shows a flow chart of a second operation of the circuit of FIG. 1.

The sub-routine of FIG. 5 is treated as a sub-routine for determining the shutter speed for the hand vibration at #13. The flows before and after the sub-routine of FIG. 5 are identical to those of the previous embodiment.

If ISON is not detected at #41 and if, at #42, the currently selected shutter speed Tv is larger than the apex value (1/f) which is the reciprocal of the lens focal distance f obtained at #5, the flag F is set to "0" at #44. If it is smaller at #42, the flag F is set to "1" at #45.

If ISON is detected at #41, whether Tv>1/f 2F is met or not is determined at #43, and if it is met, the flag F is set to "0" at #44, and if it is not met, the flag F is set to "1" at #45.

After the flag F has been set, the process proceeds to the sequence following to #14 of FIG. 3 as it does in the previous embodiment, and if F="0", the hand vibration warning is not issued, and if F="1", it is issued. Namely, the shutter speed is flashed and the buzzer 25 generates sound.

A third embodiment of the operation of the circuit of FIG. 1 is now explained with reference to a flow chart of FIG. 6 which illustrates an operation of the microcomputer 11.

In the first and second embodiments, $Tv_4$, $Tv_5$ and $Tv_6$ (in the first embodiment) and 1/f–2F (in the second embodiment) which are the shutter speeds for the hand vibration warning in the ISON state are preset in the camera. In the present embodiment, the shutter speed (Tv IS) for the hand vibration warning in the ISON state is received from the lens via communication and whether the hand vibration warning is to be issued or not is determined based on Tv IS. In a single lens reflex type camera, various lenses may be mounted as exchange lenses. Each lens has its own specific Tv IS in the microcomputer 19 (FIG. 1) in the lens and it is communicated to the microcomputer 11 in the camera body. The Tv IS may be present in accordance with the lens focal distance and the image blur correction ability of the lens.

Figure 6:
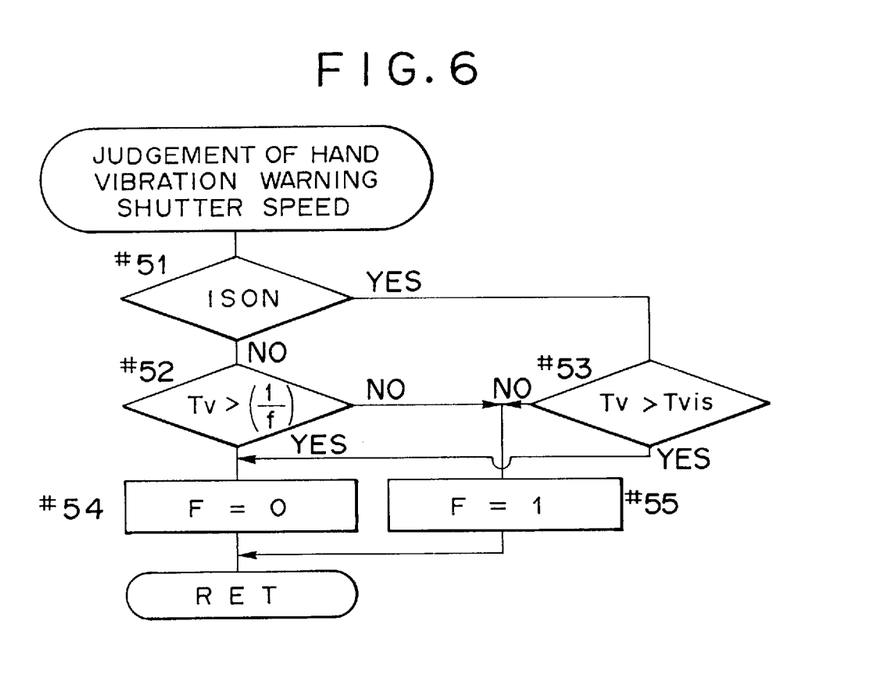
FIG. 6 shows a flow chart of a third operation of the circuit of FIG. 1.

The sub-routine of FIG. 6 is treated as the sub-routine for determining the shutter speed for the hand vibration warning at #3 of FIG. 3. The flows before and after the sub-routine of FIG. 6 are identical to those of the previous embodiments.

If ISON is not detected at #51, the currently selected shutter speed Tv and the reciprocal (1/f) of the lens focal distance f are compared at #52 as they are in the second embodiment, and if the former apex value is larger, the flag F is set to "0" at #54, and if it is smaller, the flag F is set to "1" at #55.

If ISON is detected at #51, the currently selected shutter speed Tv and the shutter speed Tv IS for the hand vibration warning are compared at #53. The information of the shutter speed Tv IS for the hand vibration warning has been inputted through the communication with the microcomputer 19 in the lens at #5 of FIG. 3. If Tv>Tv IS, the flag F is set to "0" at #54, and if Tv≦Tv IS, the flag F is set to "1" at #55.

Thus, if Tv>Tv IS, the hand vibration warning is not issued, and if Tv≦Tv IS, it is issued.

A fourth embodiment of the operation of the circuit of FIG. 1 is now explained with reference to a flow chart of FIG. 7 which illustrates an operation of the microcomputer 11.

In the above embodiments it is assumed that the ability of the lens to correct the image blur is limited. In the present embodiment, it is assumed that the ability to correct the image blur is not limited and the image blur is corrected over the entire range of the shutter speed.

Figure 7:
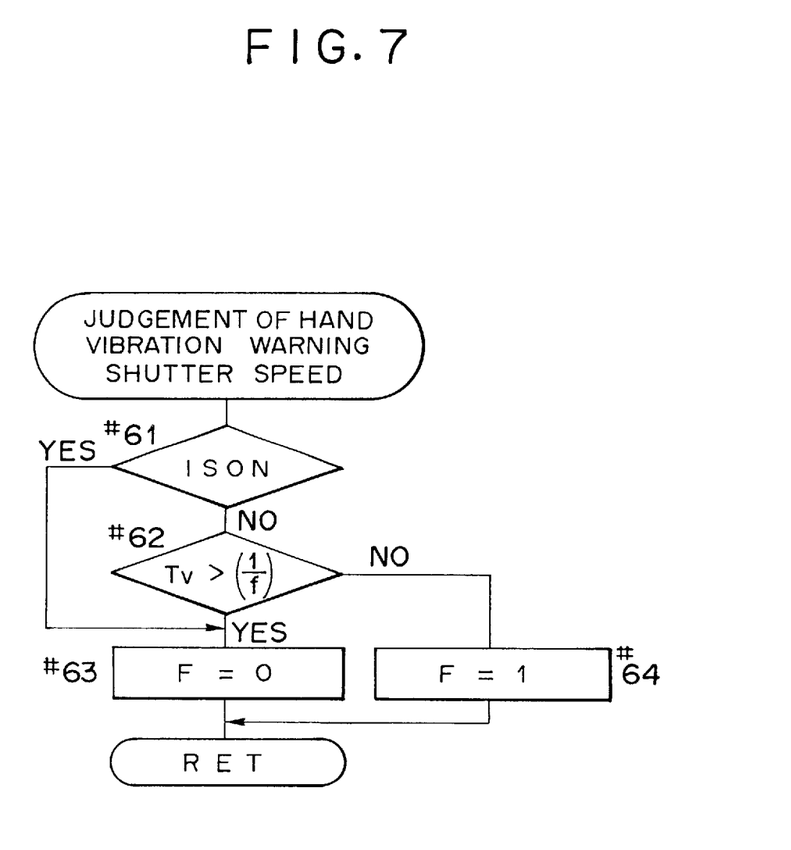
FIG. 7 shows a flow chart of a fourth operation of the circuit of FIG. 1.

The sub-routine of FIG. 7 is treated as the sub-routine for determining the shutter speed for the hand vibration warning at #13 shown in FIG. 3. The flows before and after the sub-routine of FIG. 7 are identical to those of the previous embodiments.

If ISON is not detected at #61, the currently selected shutter speed Tv and the reciprocal (1/f) of the lens focal distance f are compared at #62 as they are in the second and third embodiments. If the former apex value is larger, the flag F is set to "0" at #63, and if it is smaller the flag F is set to "1" at #64. On the other hand, if ISON is detected at #61, the process proceeds to #63 to set the flag F to "0".

Thus, when ISON is detected, the flag F is set to "0" and the hand vibration warning is not issued.

In the above embodiments, the shutter speed for the hand vibration warning in the ISON state is shifted to a lower speed or abolished so that the state of the image stabilizing device can be conveyed to the operator. Furthermore by lowering of the threshold shutter speed, below which a hand vibration warning will be produced, when the image stabilizing device is operating, or by inhibiting the vibration warning during such operation, a range in which the operator may take a photograph without interruption is expanded.

The present invention is not limited to the above embodiments. For example, the shutter speed for the hand vibration warning may be set in any manner, and the process may proceed from #8 to #13 instead of to #9 in the flow chart of FIG. 3.

What is claimed is:

1. An image blur prevention apparatus that uses an image blur correction device which corrects image blur and an operation device which performs an operation to prevent image blur independently of the image blur correction device, said apparatus comprising:

a determining device which determines whether the image blur correction device is performing a predetermined image blur correction operation; and a connecting device which controls an operation state of the operation device in accordance with a determination by said determining device, said connecting device causing the operation device to perform a predetermined operation for image blur prevention when said determining device determines that the image blur correction device is not performing the predetermined image blur correction operation.

2. Optical equipment that uses an image blur correction device which corrects image blur and an operation device which performs an operation to prevent image blur independently of the image blur correction device, said equipment comprising:

a determining device which determines whether the image blur correction device is performing a predetermined image blur correction operation; and a connecting device which controls an operation state of the operation device in accordance with a determination by said determining device, said connecting device causing the operation device to perform a predetermined operation for image blur prevention when said determining device determines that the image blur correction device is not performing the predetermined image blur correction operation.

3. A camera that uses an image blur correction device which corrects image blur and an operation device which performs an operation to prevent image blur independently of the image blur correction device, said camera comprising:

a determining device which determines whether the image blur correction device is performing a predetermined image blur correction operation; and a connecting device which controls an operation state of the operation device in accordance with a determination by said determining device, said connecting device causing the operation device to perform a predetermined operation for image blur prevention when said determining device determines that the image blur correction device is not performing the predetermined image blur correction operation.

4. An apparatus adapted to use an image blur correction device which corrects image blur and an operation device which performs an operation to prevent image blur independently of the image blur correction device, the apparatus comprising:

a determining device which determines whether the image blur correction device is performing a predetermined image blur correction operation; and a connecting device which controls an operation state of the operation device in accordance with a determination of said determining device, said connecting device causing the operation device to perform a predetermined operation for image blur prevention when said determining device determines that the image blur correction device is not performing the predetermined image blur correction operation.

5. An apparatus according to claim 4, wherein the image blur correction device comprises means for optically correcting image blur.

6. An apparatus according to claim 4, wherein the operation device comprises information means for informing a user of the possibility of image blur occurring.

7. An apparatus according to claim 4, wherein the operation device comprises means for determining a possibility of image blur occurring in a predetermined manner and for informing the user based on a determination by said determining means, and comprises means for performing an information operation corresponding to the determination in the predetermined manner when said determining device determines that the image blur correction device is not performing the predetermined image blur correction operation.

8. An apparatus according to claim 6, wherein the operation device comprises means for determining the possibility of image blur occurring in a predetermined manner and for informing the user based on a determination by said determining means, and comprises means for performing an information operation corresponding to the determination in the predetermined manner when said determining device determines that the image blur correction device is not performing the predetermined image blur correction operation.

9. An apparatus according to claim 4, wherein said determining device comprises means for determining that the image blur correction device is not performing the predetermined image blur correction operation based on a state of a switch for determining an operation or a non-operation of image blur correction.

10. An apparatus according to claim 4, wherein said connecting device comprises means for causing the operation device not to perform the predetermined operation when said determining device determines that the image blur correction device is performing the predetermined image blur correction operation.

11. An apparatus according to claim 10, wherein said connecting device comprises means for causing the operation device to perform an operation different from the predetermined operation when said determining device determines that the image blur correction device is performing the predetermined image blur correction operation.

12. An apparatus according to claim 7, wherein said connecting device comprises means for performing an information operation corresponding to a determination in a manner different from the predetermined manner when said determining device determines that the image blur correction device is performing the predetermined image blur correction operation.

13. An apparatus used with an image blur correction apparatus for a camera, the camera including (1) an image blur correction device for correcting an image blur corresponding to an output of a vibration detection device that detects a vibration of the apparatus, (2) a switch for setting the image blur correction device in an operable state or an inoperable state, and (3) a release operation portion for performing a predetermined release operation, said apparatus comprising:

determination means for determining whether a vibration detected by the vibration detection device is larger than a predetermined level;

alarm control means for performing a predetermined alarm operation of an alarm device in accordance with a determination result of said determination means when the vibration detected by the vibration detection device is larger than the predetermined level, said alarm control means performing the predetermined alarm operation at a timing when the release portion Performs the predetermined release operation; and control means, responsive to the setting of the switch, for (1) determining whether or not to perform said predetermined alarm operation, or (2) varying the predetermined level of said determination means.

14. An apparatus according to claim 13, wherein said alarm control means controls said alarm device to perform the predetermined alarm operation when the image blur correction device is in the inoperative state.

15. An apparatus according to claim 13, wherein said alarm control means control said alarm device to perform the predetermined alarm operation when a shutter speed of the camera is slower than a predetermined level.

16. An apparatus according to claim 13, wherein said alarm control meand controls said alarm device to perform the predetermined alarm operation when the image blur correction device is in a first state where it cannot perform a predetermined function and does not perform the predetermined alarm operation when the image blur correction device is in a second state where it can perform the predetermined function.

17. An apparatus according to claim 13, wherein said alarm device performs the predetermined alarm operation based on a predetermined judgement when the image blur correction device is in the first state and does not perform the predetermined alarm operation based on the predetermined judgement when the image blur correction device is in the second state.

18. An apparatus according to claim 16 wherein said alarm device includes means for performing another alarm operation which is different from said predetermined alarm operation when said image blur correction device is in the second state.

19. An apparatus according to claim 17, wherein said alarm device includes means for performing another alarm operation based on another judgement which is different from the predetermined judgement when said image blur corrrection device is in the second state.

20. An apparatus according to claim 13, wherein said alarm device includes means for performing the predetermined alarm operation in response to an operation of said release operation portion that causes the camera to perform a photography preparation operation.

21. An apparatus according to claim 20, wherein said alarm device includes means for performing the predetermined alarm operation in response to an operation of said release operation portion that causes the camera to perform an exposure condition determination operation.

22. An apparatus according to claim 13, wherein said release operation portion is capable of performing a first operation where it moves in a first stroke and a second operation where it moves in a second stroke which is larger than said first stroke, and where said second operation of said release operation portion is a releasing operation of the camera, and said alarm control device controls said alarm device to perform the predetermined alarm operation in response to the first operation of said release operation portion.

23. An apparatus according to claim 13, wherein said alarm device includes means for performing the predetermined alarm operation in response to a predetermined operation of the release operation member which is performed prior to an operation of said release operation portion that causes the camera to perform a release operation.

24. An apparatus according to claim 13, wherein said image blur correction device includes means for initiating an image blur correction operation in response to an operation of the release operation portion that causes the camera to perform a releasing operation.

25. An apparatus according to claim 13, wherein said image blur correction device includes an image blur correction optical member that optically compensates for the image blur.

26. An apparatus according to claim 25, wherein said image blur correction optical member includes means for deflecting a light beam.

27. An image blur correction apparatus adapted to a camera having a release operation portion for performing a predetermined release operation, and usable with a vibration detection device for detecting a vibration of said apparatus, said apparatus comprising:

an image blur correction device which corrects an image blur corresponding to an output of the vibration detection device;

a switch which sets the image blur correction device in an operative state or an inoperative state;

determination-means for determining whether a vibration detected bv the vibration detection device is larger than a predetermined level;

alarm control means for performing an alarm operation of an alarm device in accordance with a determination result of said determination means when the vibration detected by said vibration detection device is larger than the predetermined level, said alarm control means performing the alarm operation at a timing when the release operation portion performs the predetermined release operation; and control means, responsive to the setting of the switch, for (1) determining whether or not to perform the predetermined alarm operation, or (2) varying the predetermined level of the deternation means.

28. A camera to which an apparatus, which includes (1) an image blur correction apparatus for correcting an image blur corresponding to an output of a vibration detection device that detects a vibration of the apparatus, and (2) a switch that sets the image blur correction device in an operative or inoperative state, is applied, said camera comprising:

a release operation portion;

determination means for determining whether a vibration detected by the vibration detection device is larger than a predetermined level;

alarm control means for performing a predetermined alarm operation of an alarm device in accordance with a determination result of said determination means when the vibration detected by said vibration detection device is larger than the predetermined level, said alarm control means performing the predetermined alarm operation at a timing when said release operation portion of performs the predetermined release operation; and control means, responsive to the setting of said switch, for (1) determining whether or not to perform the alarm operation, or (2) for varying the predetermined level of said determination means.

* * * * *

UNITED STATES PATENT AND TRADEMARK OFFICE
CERTIFICATE OF CORRECTION

PATENT NO. : 5,842,051

DATED : November 24, 1998

INVENTOR(S) : TOSHIYUKI KUMAKURA

It is certified that error appears in the above-identified patent and that said Letters Patent is hereby corrected as shown below:

Column 1

Line 44, "the" (first occurrence) should read --for--.

Column 2

Line 20, "11; numeral" should read --11. Numeral--.
    Line 23, "information; numeral" should read --information. Numeral--.
    Line 32, "(ISSW)" should read --(ISSW),--.

Column 3

Line 15, "thor-" should read --thr--.
    Line 66, "#30;" should read --#30.--

Column 6

Line 27, "a" should read --the--.

UNITED STATES PATENT AND TRADEMARK OFFICE
CERTIFICATE OF CORRECTION

PATENT NO. : 5,842,051

DATED : November 24, 1998

INVENTOR(S) : TOSHIYUKI KUMAKURA

It is certified that error appears in the above-identified patent and that said Letters Patent is hereby corrected as shown below:

Column 8

Line 34, "Performs" should read --performs--.
    Line 45, "control" should read --controls--.
    Line 49, "meand" should read --means--.
    Line 56, "13," should read --16,--.
    Line 63, "16" should read --16,--.

Column 10

Line 41, "of" should be deleted.

Signed and Sealed this

Sixth Day of July, 1999

Q. TODD DICKINSON

Attest:

Attesting Officer     Acting Commissioner of Patents and Trademarks